Sept. 17, 1968      L. F. BLATT      3,401,568

CARRIAGE DRIVE MECHANISM

Filed Aug. 17, 1966      2 Sheets-Sheet 1

INVENTOR

LELAND F. BLATT

BY Cullen, Sloman, & Cantor

ATTORNEYS

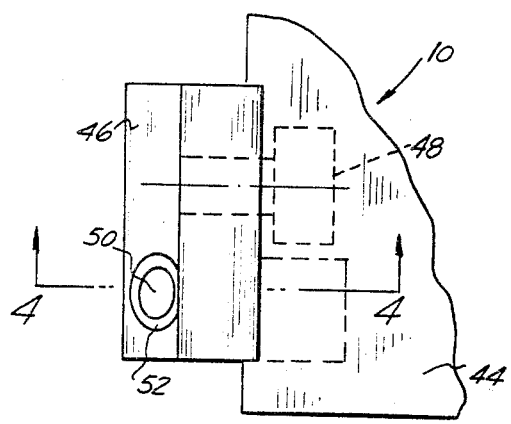
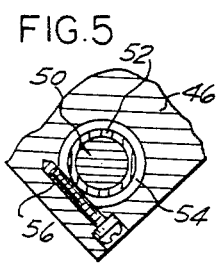
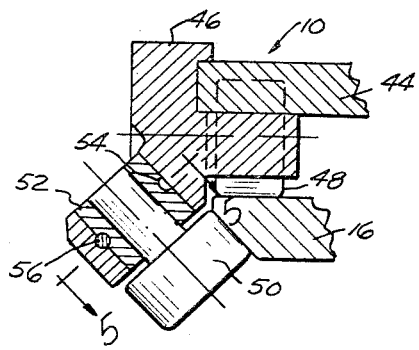

United States Patent Office 3,401,568
Patented Sept. 17, 1968

3,401,568
CARRIAGE DRIVE MECHANISM
Leland F. Blatt, Grosse Pointe, Mich.
(24121 Mound Road, Warren, Mich. 48091)
Filed Aug. 17, 1966, Ser. No. 573,005
1 Claim. (Cl. 74—37)

ABSTRACT OF THE DISCLOSURE

A tool-holding carriage is reciprocated along guide rails by a planetary gear system wherein the planet carrier rotates around a stationary sun gear, and wherein an arm coaxial with the planet gear and fixed at one end for rotation therewith is connected at its other end to the carriage to be driven. Two guide rails are each provided with two bearing surfaces at an acute angle to each other, so that when rollers mounted on the carriage engage the surfaces, they are capable of resisting thrusts applied to the carriage in any direction. The rollers are eccentrically mounted in bushings, so that selective rotation of a given bushing adjusts the position of its respective roller relative to the guide rail surface.

---

This invention relates to a mechanism for producing simple harmonic motion of a reciprocating carriage.

In the art of material handling equipment, it is frequently desirable to have a mechanism for producing reciprocating motion of a tool carrying carriage. Such a carriage might have mounted thereon a jaw type of gripper, for example, which might be employed to pick up a workpiece and transport it into a machine such as a press where an operation would be performed on the workpiece. The carriage could then either extract the workpiece when the operation was complete or return and pick up a fresh workpiece to be transported into the machine.

Accordingly, it is an object of this invention to provide a drive capable of reciprocating a tool carriage wherein the carriage is smoothly and gradually accelerated and decelerated at each end of its stroke.

It is a further object of this invention to provide a drive for a reciprocating carriage which is simple and reliable in operation and which requires a minimum of controls and maintenance.

It is still another object of this invention to provide means for supporting a reciprocating carriage relative to a guide rail, which means is capable of absorbing thrusts in two mutually perpendicular directions and which is capable of providing a fine adjustment of the carriage relative to the guide rail.

These and other objects of this invention will become apparent from the following specification when considered in conjunction with the accompanying drawings.

In these drawings:

FIG. 3 is a fragmentary plan view of one corner of the carriage, showing the bearing block.

FIG. 4 is a front sectional view in the direction of arrows 4–4 of FIG. 3.

FIG. 5 is a sectional view in the direction of arrows 5–5 of FIG. 4.

Figure 1:
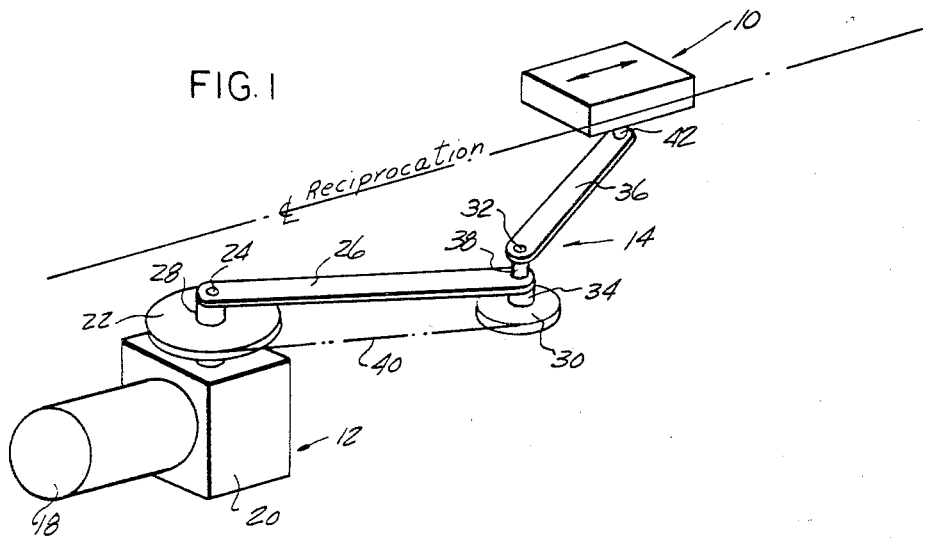
FIG. 1 is a simplified perspective view of the mechanism of this invention.

Referring now to FIG. 1, in particular, the drive mechanism generally comprises a reciprocating carriage assembly 10 which is shown greatly simplified for clarity. The actuation of the carriage assembly is accomplished by a power unit 12 operating through an actuating linkage 14. This mechanism produces reciprocating motion of carriage 10 along guide rail 16 (illustrated in FIG. 4).

Power unit 12 comprises a motor 18 which may be either electric or hydraulic, and a gear reduction unit 20. A stationary non-rotatable sprocket 22 is mounted on the upper portion of reduction unit 20 and is concentric with output shaft 24 of reduction unit 20. Drive crank 26 is fixed for rotation with output shaft 24 and is spaced above stationary sprocket 22 by spacer 28.

At the outer end of drive crank 26 is rotatably mounted driven sprocket 30, secured to shaft 32 and spaced from drive crank 26 by spacer 34. Driven crank 36 is spaced above drive crank 26 by spacer 38 and is fixed to shaft 32 so that driven crank 36 and driven sprocket 30 rotate together as a unit. Sprockets 22 and 30 lie in the same plane and are interconnected by driving chain 40. At the outer end of driven crank 36 is a shaft 42 which is rotatably secured to the lower portion of carriage assembly 10 and provides the connection between actuating linkage 14 and carriage assembly 10.

Referring now to FIGS. 3 through 5, carriage assembly 10 comprises a horizontal carriage plate 44, one corner of which is in FIG. 3. Secured to this illustrated corner of carriage plate 44 is a bearing block 46, it being understood that bearing block 46 is typical of similar units located at the other three corners of the carriage assembly. Rotatably mounted within bearing block 46 are top follower 48 and side follower 50. Top follower 48 rotates about a horizontal axis and rides along the top face of guide rail 16. Side follower 50 rotates about an inclined axis and engages an inclined lower side face of guide rail 16.

It is to be understood that two guide rails would be provided, that rail 16, illustrated in FIGS. 3 and 4 would be left hand rail of the two. If desired, guide rails 16 could be eliminated entirely since linkage 14 contains the carriage to reciprocate along the illustrated axis. In this case carriage 10 is fixedly secured to crank 36 with its longitudinal axis parallel to the center line of said crank with said crank aligned to the center line of reciprocation.

Figure 2:
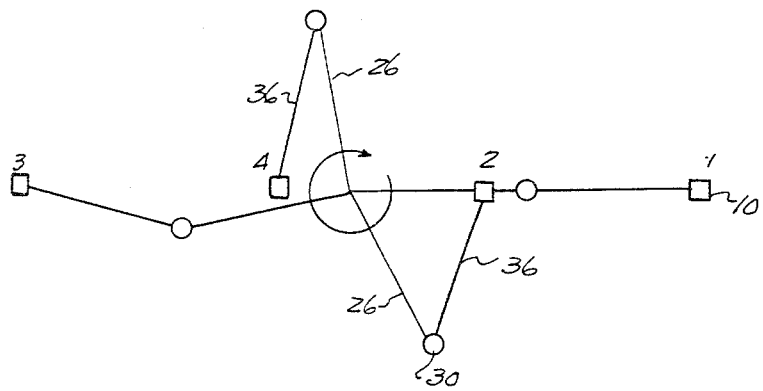
FIG. 2 is a schematic plan view of the drive linkage of FIG. 1, showing the linkage in four successive positions.

In this position the gripper is arranged upon carriage 10 projecting forwardly to grip the workpiece or part in position 1, FIG. 2. At position 2, FIG. 2, carriage 10 is still on the centerline of reciprocation, but the conveyor and the securely fixed gripper have rotated 90°. At position 3, FIG. 2, carriage and gripper and part have now rotated 180° at full end of the stroke.

Side follower 50 is rotatably mounted within eccentric bushing 52. This bushing is provided with an external groove 54 passing around its entire periphery, which groove cooperates with retaining screw 56 in a manner to be described below.

In operation, rotation of output shaft 24 causes drive crank 26 to rotate. Drive crank 26 and driven crank 36 are so dimensioned as to each be one quarter the length of the total desired reciprocation stroke. Rotation of drive crank 26 causes driven sprocket 30 to rotate about its axis, since sprocket 30 is connected to the stationary sprocket 22 by driving chain 40. Driven sprocket 30 is so dimensioned as to have a pitch diameter one-half that of stationary drive sprocket 22. This relationship of pitch diameters controls the motion of carriage assembly 10.

Rotation of driven sprocket 30 and driven crank 36 is necessarily in the opposite direction to that of drive crank 26, and the axis of reciprocation of carriage assembly 10 is perpendicular to and intersects the axis of output shaft 24.

Rotation of output shaft 24 at a constant angular velocity produces simple harmonic motion of carriage assembly 10, thus assuring smooth acceleration and deceleration at each end of the stroke.

The mechanism is illustrated schematically in several successive positions in FIG. 2. Here it can be seen that as the mechanism passes through successive positions 1, 2, 3 and 4, driven crank 36 rotates counterclockwise relative to the outer end of drive crank 26, which itself rotates in a clockwise direction.

The eccentric bushing 52 in which side follower 50 is mounted functions to provide an adjustment of the carriage assembly relative to guide rails 16. By loosening the retaining screw 56, bushing 52 can be rotated relative to bearing block 46. Rotation of bushing 52 laterally shifts the axis of follower 50, thus increasing or decreasing the space between opposed side followers 50, in turn controlling the tightness of the carriage assembly on guide rails 16. This feature permits adjustment as the parts wear, and also permits looser tolerances to be applied to the guide rail spacing and to the carriage itself. The inclination of the axis side followers 50 also enables this structure to absorb both vertical and lateral thrusts produced by actuating linkage 14.

This invention may be further developed within the scope of the following claim. Accordingly, the above specification is to be interpreted as illustrative of only a single operative embodiment, rather than in a strictly limited sense.

I now claim:
1. The improved means for supporting a reciprocating carriage upon a pair of parallel guide rails wherein the carriage is subject to thrusts in both of the directions mutually perpendicular to the axis of reciprocation, which comprises:

a plurality of rollers rotatively mounted in bushings along each side of the carriage for providing rolling contact with each of the respective guide rails;

each of said sides of the carriage having at least one roller which engages opposite sides of two converging faces of the cooperating guide rail so as to enable the carriage to remain in rolling contact with the guide rails notwithstanding external loads applied in any direction transverse to the axis of reciprocation;

said bushings each having a circular bore for receiving the axle of its respective roller, said bore being eccentric relative to the circular outside diameter of said bushing, whereby selective rotation of any of said bushings in said carriage produces lateral shifting of its respective roller, thereby to adjust the tightness between said roller and said guide rail.

References Cited

UNITED STATES PATENTS

| | | | |
|---|---|---|---|
| 952,383 | 3/1910 | Tomer | 74—52 |
| 2,358,884 | 9/1944 | Stegall | 74—52 |
| 2,572,874 | 10/1951 | MacKnight | 74—52 |
| 2,832,661 | 4/1958 | Wiley | 74—52 |
| 2,860,871 | 11/1958 | Schneider | 74—37 |
| 3,068,708 | 12/1962 | Hain | 74—37 |

FRED C. MATTERN, JR., *Primary Examiner.*

W. S. RATLIFF, *Assistant Examiner.*